F. HERMANN & L. SCHNEIDER.
COMBINATION TEST TOOL.
APPLICATION FILED NOV. 10, 1910.
997,815.
Patented July 11, 1911.
2 SHEETS—SHEET 1.
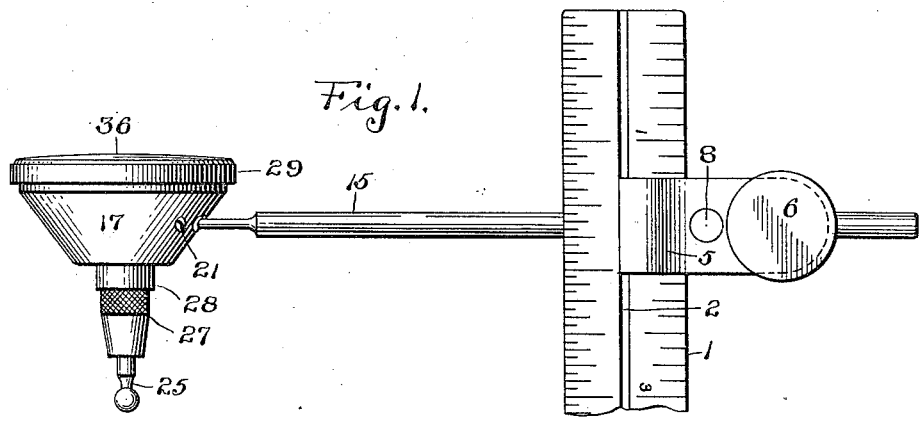
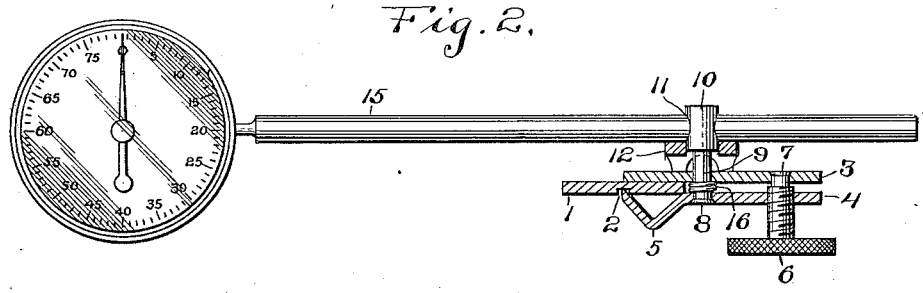
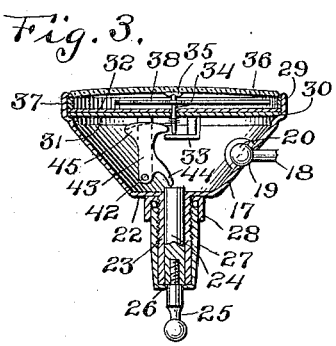
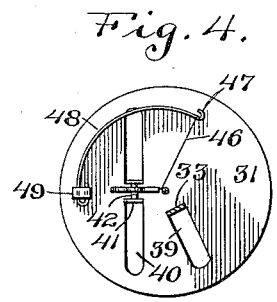
WITNESSES
INVENTORS
F. Hermann and
L. Schneider
By Attorneys F. HERMANN & L. SCHNEIDER.
COMBINATION TEST TOOL.
APPLICATION FILED NOV. 10, 1910.

997,815.

Patented July 11, 1911.

2 SHEETS—SHEET 2.

WITNESSES

INVENTORS
F. Hermann
L. Schneider
By _____ Attorneys.

UNITED STATES PATENT OFFICE.

FERDINAND HERMANN AND LOUIS SCHNEIDER, OF McKEESPORT, PENNSYLVANIA.

COMBINATION TEST-TOOL.

997,815.

Specification of Letters Patent. Patented July 11, 1911.

Application filed November 10, 1910. Serial No. 591,702.

*To all whom it may concern:*

Be it known that we, FERDINAND HERMANN and LOUIS SCHNEIDER, citizens of the United States of America, residing at McKeesport, in the county of Allegheny and State of Pennsylvania, have invented certain new and useful Improvements in Combination Test-Tools, of which the following is a specification, reference being had therein to the accompanying drawing.

This invention relates to a micrometer, and the primary object of the invention is to provide an instrument of the above type with means as will be hereinafter set forth whereby the thousandth or fractional part of an inch can be accurately measured.

Another object of the invention is to provide an instrument of the above type that can be advantageously used by machinists in connection with lathes for determining with precision the amount of material removed from a piece of work.

A still further object of the invention is to furnish a micrometer with a very sensitive mechanism that will be actuated by the minutest movement or inflection of the actuating point of the micrometer.

A still further object of this invention is to provide positive and reliable means for adjustably attaching a micrometer to a square, angle or other instrument used by machinists and other artisans.

With these and such other objects in view as may hereinafter appear, the invention consists of the novel construction, combination and arrangement of parts to be hereinafter specifically described and then claimed.

Reference will now be had to the drawings forming part of this specification, wherein there are illustrated the preferred embodiments of the invention, but it is to be understood that the structural elements thereof can be varied or changed without departing from the spirit and scope of the invention.

Figure 5:
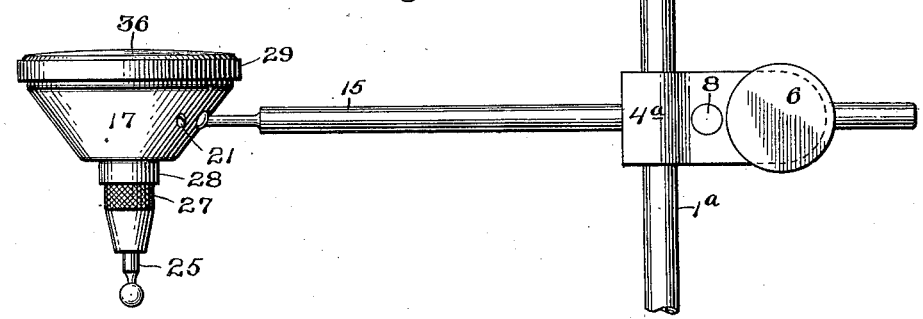
Figure 6:
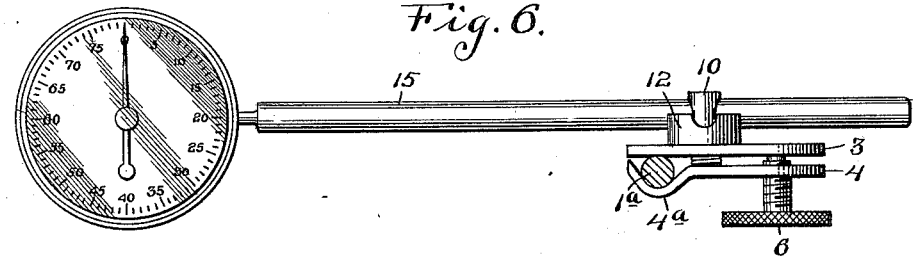
Figure 7:
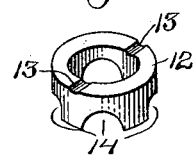

In the drawings:—Figure 1 is a side elevation of the micrometer, Fig. 2 is a plan of the same, showing the clamp thereof in longitudinal section, Fig. 3 is a vertical sectional view of the micrometer proper, Fig. 4 is a bottom plan of one of the dial plates of the micrometer, Fig. 5 is a side elevation of the micrometer showing a modified form of clamp, Fig. 6 is a plan of the same, and Fig. 7 is a perspective view of a collar forming part of the micrometer clamp.

Like numerals of reference designate corresponding parts throughout the several views of the drawings.

1 denotes the upper end of a gage or support having one side thereof provided with a vertical groove 2.

3 and 4 denote the members of a clamp, the former engaging the rear side of the gage or support 1 and the latter the front side thereof, the member 4 having a V-shaped edge adapted to engage in the groove 2. Adjustably mounted in the opposite edge of the member 4 is a set screw 6 having the en dthereof rotatably mounted, as at 7, in the end of the member 3, whereby the ends of said members can be supported to force the opposite ends of said members into engagement with the gage or support 1. The member 4 is provided with a pin 8 extending through an opening 9 in the member 3, the outer end of said pin having a head 10 provided with an opening 11.

12 denotes a collar surrounding the pin 8 against the member 3, said collar having the outer face thereof provided with grooves 13 and the inner face thereof cut away, as at 14, to reduce the weight of said collar.

15 denotes a rod slidably mounted in the opening 11 of the head 10 and adapted to engage in the grooves 13, the opening 11 being slightly larger than the diameter of the rod 15, whereby the collar 12 can be bound against the rod 15 to hold said rod in engagement with the head 10. The rod 15 is frictionally held within the head 10 by the collar 12, the collar being forced into engagement with said rod by the member 3 of the clamp, this clamp separated from the member 4 by a small compression spring 16 encircling the pin 8.

17 denotes the micrometer casing, which is adjustably connected to the end of the rod 15 by a ball and socket connection, the rod 15 being reduced, as at 18, and provided with a ball 19 adapted to engage in a socket 20 provided therefor on the inner side of the casing 17, the socket 20 being retained in place by a set screw 21. The casing 17 is of an inverted frusto-conical shape and has the flat bottom 22 thereof provided with a depending exteriorly threaded sleeve 23 in communication with the casing 17. Slidably mounted within the sleeve 23 is a plunger 24 adapted to extend into the casing 17, the lower end of said plunger being provided with an actuating point or knob 25 of a less diameter than the plunger 24, whereby the plunger 24 can be retained within the sleeve 23 by the annular inwardly projecting flange 26 of a cap 27 screwed upon the sleeve 23. The upper end of the cap 27 is protected by a head 28 soldered or otherwise connected to the flat bottom 23 of the casing 17. The upper edges of the casing 17 are reamed or off-set, as at 29 to provide an annular seat 30 for an inner dial plate 31 and an outer dial plate 32. The inner dial plate 31 is provided with a hanger 33 and journaled in said dial plate is a pivot pin 34, said pin having the lower end thereof bearing upon the hanger 33 and the upper end thereof engaging in a socket 35 carried centrally of the under side of a concave lens 36 mounted in the reamed edges of the casing 17, said lens being held above the outer dial plate 32 by a spacing ring 37. The outer dial plate 32 is graduated to represent so many degrees, and mounted upon the shaft 34 above the outer dial plate 32 is an indicator or pointer 38. The inner dial plate 31 is cut away, as at 39, and the material bent downwardly to form the hanger 33, and the same plate is likewise cut away, as at 40, and the material bent downwardly to provide hangers 41. The lower ends of these hangers are connected by a pin 42 and pivotally mounted upon said pin is an actuating lever 43 having a depending curved arm 44 adapted to engage the upper end of the plunger 24. The upper end of the lever 43 is segment-shaped, as at 45, and attached to the segment-shaped end of said lever is a thread or cable 46 which encircles the shaft 34 for a number of revolutions and has its opposite end attached to the hookshaped end 47 of a flat curved spring 48 secured to a post 49, carried by the under side of the lower inner dial plate 31.

It is apparent from the foregoing that when the actuating point or knob 25 is touched that the plunger 24 is slightly elevated or moved, and this movement of the plunger is sufficient to move the lever 43, which through the medium of the cable 46 causes the shaft 34 to rotate or partially rotate, thereby swinging the indicator or pointer 38 over the outer dial plate 32. The spring 44 is adapted to restore the indicator or pointer 38 to its normal position at zero.

In Figs. 5 and 6 of the drawings there is illustrated a modification of the clamp, wherein the member 4 has the outer edge thereof curved, as at 4ª, whereby said members can be clamped in engagement with a rod 1ª, otherwise the construction is the same as previously described.

As an instance of the use of micrometer, we cite the following in connection with a large lathe or planer. The micrometer can be set whereby a piece of work moving back and forth on the lathe will contact with the actuating point or knob 25 and indicate each time the amount of material removed from the piece of work. This in accomplished by setting the micrometer in engagement with the piece of work and with the spring 48 under tension. We will assume that the indicator or pointer 38 is at the 40 degree mark when the work is started, and after material has been removed or planed from the piece of work, the indicator or pointer will recede to the degree mark 30, thereby showing that ten degrees of material has been removed from the work. Now, this ten degrees may represent the fractional part of an inch, and as the micrometer is constructed, one complete swing or rotation of the indicator or pointer 38 represents one thousandth part of an inch, consequently the one thousandth part of an inch when divided into the eighty degrees or parts as shown on the dial 32 allows a measurement to be made that could not otherwise be ascertained, particularly while a piece of work is being operated upon.

What we claim is:—

1. In a micrometer, the combination with a support, of a rod adjustably connected thereto, a casing movably supported by the outer end of said rod, a dial carried by said casing, a shaft journaled in said dial, an indicator carried by the upper end of said shaft adapted to swing over said dial, an actuating lever located in said casing, a spring arranged within said casing, a cable connected to the upper end of said actuating lever and wound upon said shaft and having the opposite end thereof connected to said spring, and a plunger extending into the lower end of said casing and adapted to actuate said lever.

2. A micrometer, comprising a support, a casing adjustably carried thereby, a dial carried by said casing, a shaft journaled in said dial, an indicator carried by the upper end of said shaft and adapted to swing above said dial, an actuating lever pivoted at its lower end within said casing and having its upper end operatively connected with said shaft whereby when the lever is operated rotary movement is imparted to said shaft, said lever having its lower end provided with an arm, and a plunger movably mounted in the lower end of said casing and engaging said arm for operating said lever.

3. A micrometer comprising a casing, upper and lower dial plates arranged in said casing, a shaft journaled in said plates, an indicator carried by the upper end of said shaft and adapted to swing above the upper dial plate, a spring carried by the lower dial plate, a pivoted actuating lever supported from said lower dial plate and provided at its lower end with an arm, a cable attached to the upper end of said lever and wound upon said shaft and having the opposite end thereof attached to said spring, and a plunger movably mounted in the lower end of said casing and engaging said arm for operating said lever.

In testimony whereof we affix our signatures in the presence of two witnesses.

FERDINAND HERMANN.
LOUIS SCHNEIDER.

Witnesses:
CHRISTINA T. HOOD,
EVA A. MILNE.

Copies of this patent may be obtained for five cents each, by addressing the "Commissioner of Patents, Washington, D. C."